US012759441B2

(12) United States Patent
Kim et al.

(10) Patent No.: US 12,759,441 B2
(45) Date of Patent: Oct. 13, 2026

(54) VIBRATION ISOLATION STRUCTURE APPLIED BETWEEN UPPER AND LOWER SEAT FRAMES FOR VEHICLE

(71) Applicants: Hyundai Motor Company, Seoul (KR); Kia Corporation, Seoul (KR); DAS CO., LTD, Gyeongsangbuk-do (KR)

(72) Inventors: Tae Su Kim, Gyeonggi-do (KR); Min Hyuk Kwak, Gyeonggi-do (KR); Hyun Ko, Gyeonggi-do (KR); Du Go Jung, Gyeonggi-do (KR); Jong Soon Lee, Ulsan (KR); Hyun Gyu Jo, Ulsan (KR); Ik Sang Oh, Gyeongsangbuk-do (KR)

(73) Assignees: Hyundai Motor Company, Seoul (KR); Kia Corporation, Seoul (KR); DAS CO., LTD, Gyeongju (KR)

( * ) Notice: Subject to any disclaimer, the term of this patent is extended or adjusted under 35 U.S.C. 154(b) by 920 days.

(21) Appl. No.: 18/080,571

(22) Filed: Dec. 13, 2022

(65) Prior Publication Data

US 2024/0001827 A1 Jan. 4, 2024

(30) Foreign Application Priority Data

Jul. 4, 2022 (KR) ........................ 10-2022-0081747

(51) Int. Cl.

| | |
|---|---|
| ***B60N 2/50*** | (2006.01) |
| ***B60N 2/68*** | (2006.01) |
| ***F16C 29/04*** | (2006.01) |
| ***F16C 33/60*** | (2006.01) |

(52) U.S. Cl.
CPC ............... *B60N 2/502* (2013.01); *B60N 2/68* (2013.01); *F16C 29/04* (2013.01); *F16C 33/605* (2013.01); *F16C 2326/08* (2013.01)

(58) Field of Classification Search
CPC . B60N 2/502; B60N 2/68; F16C 29/04; F16C 33/605; F16C 2326/08
USPC ...................................... 297/344.11; 248/638
See application file for complete search history.

(56) References Cited

U.S. PATENT DOCUMENTS

| | | | | |
|---|---|---|---|---|
| 4,401,290 A * | 8/1983 | Butler | B60N 2/544 | 248/580 |
| 5,310,156 A * | 5/1994 | Matsumura | A47B 91/00 | 248/188.9 |
| 5,765,803 A * | 6/1998 | Graham | B60N 2/544 | 267/221 |

(Continued)

FOREIGN PATENT DOCUMENTS

| | | | |
|---|---|---|---|
| DE | 69409573 T2 | 12/1998 | |
| DE | 102008010719 A1 * | 8/2009 | B60N 2/0732 |

(Continued)

*Primary Examiner* — Jose V Chen
(74) *Attorney, Agent, or Firm* — Fox Rothschild LLP

(57) ABSTRACT

Provided is a vibration isolating apparatus for isolating vibration from being transferred from a vehicle to a seat during idling and traveling. The vibration isolating apparatus provides an isolation structure applied between the upper and lower seat frames for a vehicle. A bearing unit having a low friction characteristic are applied so that horizontal vibration is effectively isolated without an up-and-down motion. A damping unit capable of attenuating the motion and frictional noise is applied.

18 Claims, 4 Drawing Sheets

(56) References Cited

U.S. PATENT DOCUMENTS

| | | | | | |
|---|---|---|---|---|---|
| 6,840,703 | B2 * | 1/2005 | Blanchard | F16B 19/109 403/322.2 |
| 7,309,107 | B2 * | 12/2007 | Smith | B60N 2/073 297/344.11 |
| 7,416,244 | B2 * | 8/2008 | Polk | B62D 33/0604 296/190.07 |
| 8,016,067 | B2 * | 9/2011 | Horgas | F16F 15/08 180/312 |
| 8,191,850 | B2 * | 6/2012 | Wetzig | B60N 2/0727 296/65.01 |
| 8,376,460 | B2 * | 2/2013 | Nadgouda | B60N 2/0715 297/344.11 |
| 8,733,725 | B2 * | 5/2014 | Kimura | B60N 2/0705 296/65.13 |
| 8,844,298 | B2 * | 9/2014 | Woidtke | F25D 19/006 62/51.1 |
| 8,910,926 | B2 * | 12/2014 | Okamura | F16F 13/103 267/140.13 |
| 9,027,899 | B2 * | 5/2015 | Haller | B60N 2/0722 384/7 |
| 11,338,711 | B1 * | 5/2022 | Gilmore | B60N 2/546 |
| 11,668,325 | B2 * | 6/2023 | Nanjappa | F04D 17/16 415/119 |
| 2009/0203455 | A1 * | 8/2009 | Tokioka | F16D 3/065 464/167 |
| 2013/0318796 | A1 * | 12/2013 | Langer | B21K 1/30 29/898.04 |
| 2016/0017922 | A1 * | 1/2016 | Verbe | F16C 33/588 29/898.061 |
| 2016/0061260 | A1 * | 3/2016 | Bussit | F16C 33/62 384/492 |
| 2018/0029714 | A1 * | 2/2018 | Lucas | B64D 11/0696 |
| 2018/0215292 | A1 * | 8/2018 | Ochs | B60N 2/0031 |
| 2023/0036617 | A1 * | 2/2023 | Muck | B60N 2/686 |
| 2023/0375040 | A1 * | 11/2023 | Carroll | F16C 29/048 |
| 2024/0418212 | A1 * | 12/2024 | Deschamps | F16C 29/123 |
| 2025/0162472 | A1 * | 5/2025 | Schanderl | B60N 2/04 |
| 2025/0176713 | A1 * | 6/2025 | Wen | F16C 29/04 |

FOREIGN PATENT DOCUMENTS

| | | | |
|---|---|---|---|
| DE | 102008012888 | A1 | 9/2009 |
| KR | 10-1906038 | B1 | 10/2018 |

* cited by examiner

VIBRATION ISOLATION STRUCTURE APPLIED BETWEEN UPPER AND LOWER SEAT FRAMES FOR VEHICLE

CROSS REFERENCE TO RELATED APPLICATION

The present application claims under 35 U.S.C. § 119(a) the benefit of Korean Patent Application No. 10-2022-0081747, filed Jul. 4, 2022, the entire contents of which are incorporated herein for all purposes by this reference.

BACKGROUND OF THE DISCLOSURE

Technical Field

The present disclosure relates generally to a vibration isolation structure applied to a vehicle seat and, more particularly, to a vibration isolation structure applied between upper and lower seat frames for a vehicle to isolate vibration from being transferred to a seat, the vibration isolation structure acting as a structure for isolating vibration transmitted from a vehicle body to a seat and including a bearing unit having a low friction characteristic, to thereby effectively isolate horizontal vibration without an up-and-down motion.

BACKGROUND

Today's vehicles are evolving into business, rest, and living spaces beyond simple moving means, and especially quietness is emerging as an important issue. Vibration, which is introduced into an interior when a vehicle is driven on an uneven road surface, is excessively transmitted through a firm seat structure from a seat lower portion to a seat upper portion. When exposed to excessive vibration for a long time, especially excessive horizontal vibration, a passenger suffers from various physical discomforts such as fatigue, anxiety, emesis, muscular pain, blurry vision, etc., as well as mental stress. Further, when a resonant phenomenon of in-vehicle components occurs due to repetitive/cyclic vibration, firm coupling of each of mechanical components becomes loose to cause noises, which leads to abnormal operation of the mechanical components, and has a bad influence on durability and reliability, for example, such vibration causes the mechanical components to be damaged falling short of life expectancy due to fatigue thereof.

In the past, as a method for reducing harmful vibration introduced into the seat from the vehicle body, either a method of changing a natural frequency by varying hardness of the cushion and hardness of a backrest pad, or rigidity of the seat depending on weight and material of the seat frame to thereby change a natural frequency, or a method of installing an attenuator to an upper end of the seat and separating a resonant frequency of the seat has mainly been used. However, there has been a problem of realizing effects except in a specific frequency region among various types of vibration generated from various vibrating sources such as revolution per minute (RPM) of the engine, roughness of a tire or a road surface, a running speed, and so on.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly; the present disclosure has been made keeping in mind the above problems occurring in the related art, and the present disclosure relates to a vibration isolating apparatus for isolating vibration from being transferred from a vehicle to a seat during idling and traveling, and particularly, provides an isolation structure applied between the upper and lower seat frames for a vehicle, wherein a bearing unit having a low friction characteristic are applied so that horizontal vibration is effectively isolated without an up-and-down motion, and wherein a damping unit capable of attenuating the motion and frictional noise is applied.

The objectives of the present disclosure are not limited to the aforementioned description, and other objectives not explicitly disclosed herein will be clearly understood by a person having ordinal), skill in the art from the description provided hereinafter. Further, the objectives of the present disclosure can be realized by means presented in the claims, and combinations thereof.

In order to achieve the above objectives, the isolation structure applied between upper and lower seat frames for a vehicle to isolate vibration from being transferred to a seat includes the following configuration.

In an embodiment of the present disclosure, the vibration isolation structure applied between upper and lower seat frames for a vehicle includes: a lower assembly configured to fix a lower portion of the seat flame and fastened to a vehicle body; an upper assembly configured to fix an upper portion of the seat frame; a plate located below and apart from the lower assembly; and a bearing unit located between the upper assembly and the lower assembly and between the lower assembly and the plate, and configured to include bearings shifted in response to vibration transmitted to the lower assembly, wherein the upper assembly, the bearing unit, the lower assembly, and the plate are coupled through a fastener without an up-and-down play.

Further, the vibration isolation structure may be configured to further include a damping unit disposed between the upper assembly and the lower assembly so as to be configured to attenuate flow noise and friction noise.

Further, the bearing unit may include: upper rollers formed between the upper assembly and the lower assembly in a plurality of numbers, and configured to support the upper portion of the seat frame; an upper retainer configured to guide the plurality of upper rollers to be rotated with predetermined interval maintained; lower rollers formed between the lower assembly and the plate in a plurality of numbers, and configured to support the lower portion of the seat frame; and a lower retainer configured to guide the plurality of lower rollers with predetermined interval maintained.

Further, the isolation structure applied between upper and lower seat frames for a vehicle is provided such that, when vibration is transmitted to the lower assembly and when the lower assembly is displaced within a preset displacement value, vibration energy transmitted to the lower assembly is converted into kinetic energy of the bearing unit.

Further, the isolation structure applied between upper and lower seat frames for a vehicle is provided such that, when vibration is transmitted to the lower assembly and thus the lower assembly is displaced in excess of a preset displacement value, the vibration energy transmitted to the lower assembly may be converted into kinetic energy of the bearing unit, and the damper may be configured to additionally attenuate the flow noise and the friction noise.

Further, in the isolation structure applied between upper and lower seat frames for a vehicle, the upper retainer and the lower retainer may be configured to further include an opening in which the fastener is located, and an area of the opening may be configured to have an area that is relatively wider than a cross-sectional area of the fastener.

Further, in the isolation structure applied between upper and lower seat frames for a vehicle, the upper rollers and the lower rollers are configured to have a ball shape or a roller shape.

According to the present disclosure, it is possible to obtain the effects as follows from coupling and usage relations between the previously seen present embodiment and a configuration to be described below.

The present disclosure applies a bearing unit having a low friction characteristic to effectively isolate vibration from being transmitted from the vehicle body to the seat, thereby having an effect of providing ride comfort to a passenger as well as contributing to improving a durable lifespan of the seat component through resonance avoidance.

Further, the present disclosure applies a damper capable of attenuating flow noise and friction noise between the upper assembly and the lower assembly, thereby having an effect of reducing indoor noise of the vehicle.

In some embodiments, each of the upper rollers and the lower rollers may have a ball shape, and the bearing unit is displaced in multiple directions.

In some embodiments, each of the upper rollers and the lower rollers may have a roller shape, and the bearing unit is displaced in in a horizontal direction In some embodiments, the fastener may be made up of a bolt, a nut or a rivet coupling structure.

In some embodiments, the lower assembly may be a leg assembly that fixes the lower portion of the seat frame.

In some embodiments, the upper assembly may be a cushion assembly that fixes the upper portion of the seat frame.

In one embodiment, a vehicle comprising the vibration isolation structure may be provided.

In another embodiment, vehicles may be provided that comprise an apparatus as disclosed herein.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
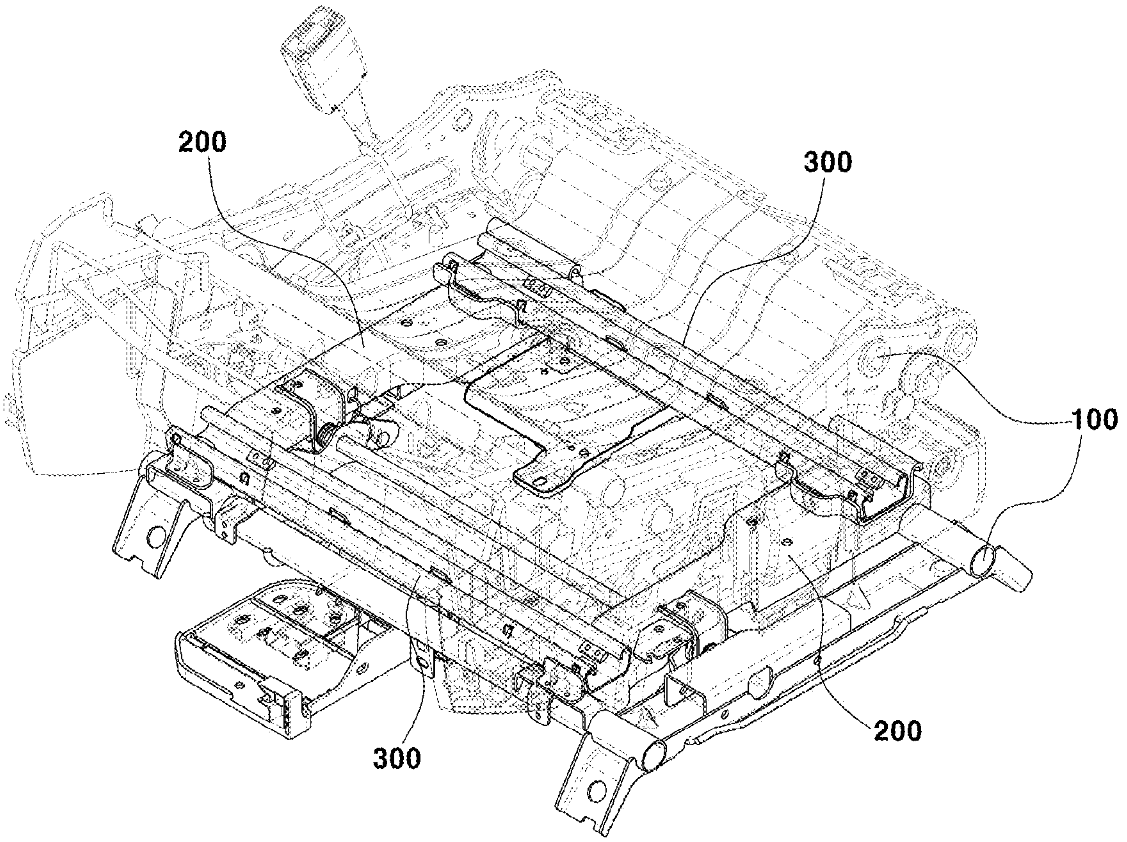
FIG. 1 is a perspective view illustrating a seat frame on which an isolation structure applied between upper and lower seat frames for a vehicle is mounted as an embodiment of the present disclosure.

Hereinafter, embodiments of the present disclosure will be described in more detail with reference to the accompanying drawings. The embodiments of the present disclosure may be variously modified in forms, and the scope of the present disclosure should not be construed as being limited to the embodiments described below. The embodiments are provided to more fully illustrate the present disclosure to those skilled in the art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

In addition, terms, such as "module", "unit", and "panel", refer to elements respectively performing at least one function or operation. The "module", "unit", "panel", and the like may be realized as hardware or a combination of hardware.

Further, a "vertical direction", a "horizontal direction", a "widthwise direction", and a "lengthwise direction" are set on the basis of the seat for the vehicle.

Further, when any portion is located "on" or "above" another portion, this includes the case located "directly on" the other portion, as well as the case where yet another portion is located between them. Moreover, when any portion is located "under" or "below" another portion, this includes the case located "directly under" the other portion, as well as the case where yet another portion is located between them.

Further, the present disclosure has been made on the basis of one seat, but it may be applied to two seats or a plurality of rows of seats in symmetry.

Figure 2:
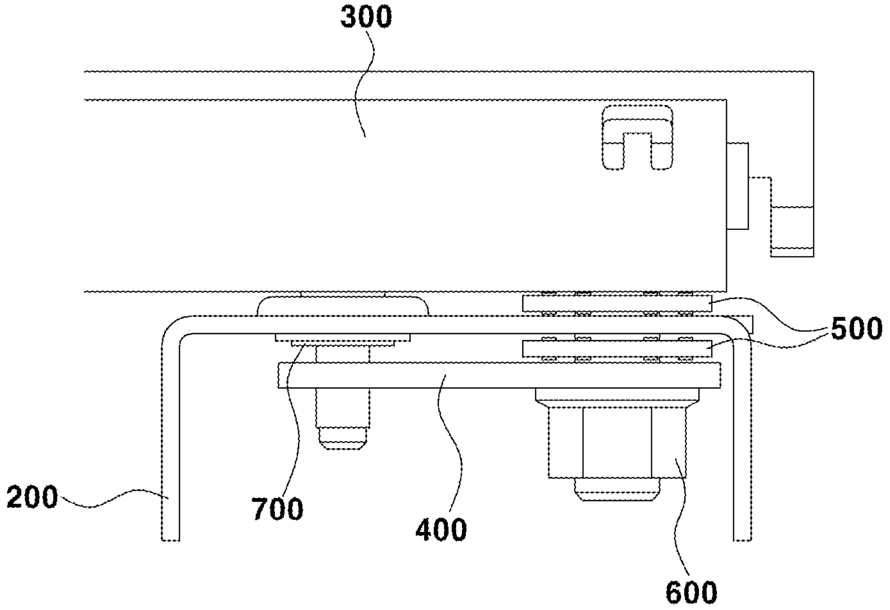
FIG. 2 is a side view illustrating the isolation structure applied between the upper and lower seat frames for the vehicle is mounted as an embodiment of the present disclosure.

FIG. 1 is a perspective view illustrating a seat frame on which an isolation stricture, as an embodiment of the present disclosure, applied between upper and lower seat frames for a vehicle is mounted, and FIG. 2 is a side view illustrating the isolation structure applied between the upper and lower seat frames for the vehicle is mounted as an embodiment of the present disclosure.

Referring to FIGS. 1 and 2, an isolation structure applied between upper and lower seat frames for a vehicle according to an embodiment of the present disclosure may include an upper assembly 300, a lower assembly 200, a plate 400, and a bearing unit 500 located between the upper assembly 300 and the plate 400. The vibration transferred from the vehicle body to the seat is transferred to a lower portion of the seat frame 100, and the bearing unit 500 may be configured to offset this vibration to control the vibration transmitted to an upper portion of the seat frame 100 to be protected.

To be more specific, an isolation structure applied between upper and lower seat frames for a vehicle according to an embodiment of the present disclosure may include a lower assembly 200, an upper assembly 300, a plate 400, a bearing unit 500, and a fastener 600. The seat frame 100 is divided into an upper portion and a lower portion. The upper portion of the seat frame 100 may be connected to the upper assembly 300, and the lower portion of the seat flume 100 may be connected to the lower assembly 200.

The lower assembly 200 may fix the lower portion of the seat frame 100, and may be fastened to the vehicle body. As an example embodiment, the lower assembly 200 may be a leg assembly that fixes the lower portion of the seat frame 100. The lower assembly 200 may primarily receive the vibration transmitted to the vehicle body while the vehicle is stopped or driven.

The upper assembly 300 is located above and apart from the lower assembly 200, and may be configured to fix the upper portion of the seat frame 100. As an example embodiment, the upper assembly 300 may be a cushion assembly that fixes the upper portion of the seat frame 100. The plate 400 may be located below and apart from the lower assembly 200. On the basis of the lower assembly 200, the upper assembly 300 may be located above, and the plate 400 may be located below.

The bearing unit 500 may be located between the upper assembly 300 and the lower assembly 200 and between the lower assembly 200 and the plate 400. The bearing unit 500 may include bearings that move in response to the vibration transmitted to the lower assembly 200. The bearing unit 500 may be configured to slide in a horizontal direction when the vibration is directly introduced from the vehicle body to the lower assembly 200. Through this configuration, vibration energy is converted into rotational and translational motion energy of the bearing unit 500, so that this configuration may be configured to inhibit the vibration energy from being transmitted to the upper assembly 300.

To be more specific, a part of the bearing unit 500 is located between the lower assembly 200 and the upper assembly 300, and may be configured to support a load of the upper assembly 300 as well as isolate the vibration transmitted to the upper assembly 300. Likewise, the other part of the bearing unit 500 is located between the lower assembly 200 and the plate 400, and may be configured to support a load of the lower assembly 200 as well as to convert the vibration transmitted to the lower assembly 200 into kinetic energy of the other bearing unit 500.

When vibration is transmitted to the lower assembly 200 so that the lower assembly 200 moves horizontally, the part of the bearing unit 500, which is located between the lower assembly 200 and the upper assembly 300, may slide at the upper side of the lower assembly 200 in a moving direction of the lower assembly 200. When vibration is transmitted to the lower assembly 200 so that the lower assembly 200 moves horizontally, the other part of the bearing unit 500, which is located between the lower assembly 200 and the plate 400, may slide at an upper side of the plate 400.

The upper assembly 300, the bearing unit 500, the lower assembly 200, and the plate 400 may be coupled through the fastener 600 without an up-down play. To be more specific, the bearing unit 500 are respectively disposed at the upper and lower portions of the lower assembly 200, and the upper assembly 300 and the plate 400 are disposed at the upper and lower portions of the respective bearing unit 500, and are coupled by the fastener 600, and thereby it may be configured such that no play exists at the upper and lower portions of the seat frame 100 in the height direction. As an example, the fastener 600 may be made up of a bolt and a nut. As another example, the fastener 600 may be formed of a rivet coupling structure. The fastener 600 may be configured to penetrate and couple the upper assembly 300, the bearing unit 500, the lower assembly 200, and the plate 400.

The isolation structure applied between upper and lower seat frames for a vehicle according to an embodiment of the present disclosure may be configured to further include a damper 700. The damper 700 may be configured to be disposed between the upper assembly 300 and the lower assembly 200 so as to attenuate flow noise and friction noise. In the present disclosure, the term "noise" includes flow noise generated between the members that relatively move in a state apart from each other, and friction noise generated between the members that relatively move in a state brought into close contact with each other, and may be a concept that covers all types of noise resulting from relative displacement in addition to the above.

The damper 700 may be configured to relieve shocks transmitted to the seat frame 100 in the vehicle and to damp vibration. As an embodiment, the damper 700 may be configured to suppress noise generation caused by direct shock between the components when the lower assembly 200 diverges from a sliding range allowed by design during driving of a rough road or an uneven section, or during turning of the vehicle.

Figure 3:
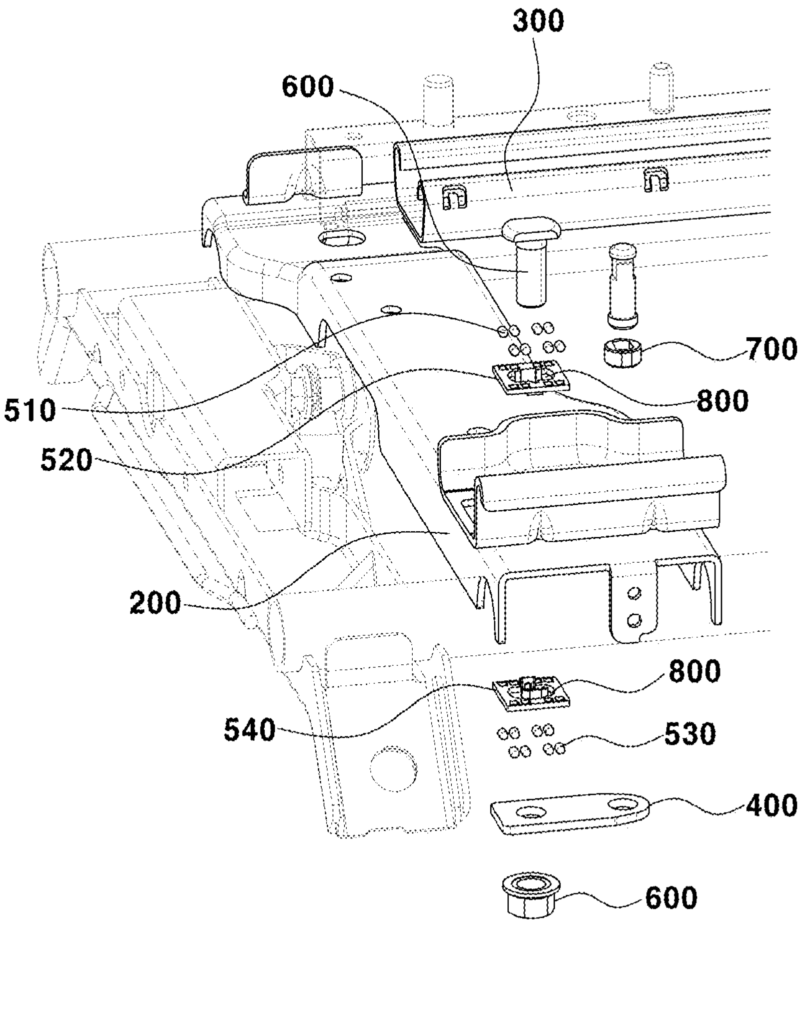
FIG. 3 is a view illustrating a configuration of the isolation structure applied between the upper and lower seat frames for the vehicle is mounted as an embodiment of the present disclosure.

FIG. 3 is a view illustrating a configuration of the isolation structure applied between the upper and lower seat frames for the vehicle as an embodiment of the present disclosure.

Referring to FIG. 3, the bearing unit 500 according to an embodiment of the present disclosure may include upper rollers 510, an upper retainer 520, lower rollers 530, and a lower retainer 540. More preferably, it may be configured such that the upper rollers 510 and the upper retainer 520 are located at an upper portion of the lower assembly 200, and the lower rollers 530 and the lower retainer 540 are located at a lower portion of the lower assembly 200.

The upper rollers 510 are formed in plural number between the upper assembly 300 and the lower assembly 200, and may be configured to support the upper portion of the seat frame 100. The upper rollers 510 are formed in plural number, and may be configured to effectively distribute the weight of a passenger who sits on the seat and a weight of the seat itself.

The upper retainer 520 may guide the plurality of upper rollers 510 such that the upper rollers 510 are rotated in a state in which they maintain predetermined interval. To be more specific, the upper retainer 520 is formed to have a plurality of holes into which the upper rollers 510 may be inserted, and thus may guide the upper rollers 510 so as to carry out rotary motion and translational motion with predetermined interval maintained.

The lower rollers 530 are formed in plural number between the lower assembly 200 and the plate 400, and may be configured to support the lower portion of the seat frame 100. The lower rollers 530 are formed in plural number, and may be configured to effectively distribute the weight of a passenger who sits on the seat and a weight of the seat itself.

The lower retainer 540 may guide the plurality of lower rollers 530 such that the lower rollers 530 are rotated in a state in which they maintain predetermined interval. To be more specific, the lower retainer 540 is formed to have a plurality of holes into which the lower rollers 530 may be inserted, and thus may guide the lower rollers 530 so as to carry out rotary motion and translational motion with predetermined interval maintained.

In an embodiment, when an external force is applied to the vehicle so that vibration is transmitted to the lower assembly 200, the lower assembly 200 is displaced in a horizontal direction, and in response, the plurality of upper rollers 510 may carry out rotary motion and translational motion in the moving direction of the lower assembly 200. The upper assembly 300 may be displaced in a direction opposite to the moving direction of the lower assembly 200 due to the rotary motion of the upper rollers 510, and may be displaced in the same direction as the moving direction of the lower assembly 200 due to the translational motion of the upper rollers 510. As a result, a whole movement amount of the upper assembly 300 may be offset to maintain an immovable state. Accordingly, it is possible to attenuate the vibration which the passenger feels when sitting on the seat.

Meanwhile, when an external force is applied to the vehicle so that vibration is transmitted to the lower assembly 200, the lower assembly 200 is displaced in a horizontal direction, and in response, the plurality of lower rollers 530 that is in an immovable state may carry out the rotary motion and the translational motion in the moving direction of the lower assembly 200. As a result, the plate 400 may maintain an immovable state due to the rotary motion and the translational motion of the lower rollers 530.

Figure 4:
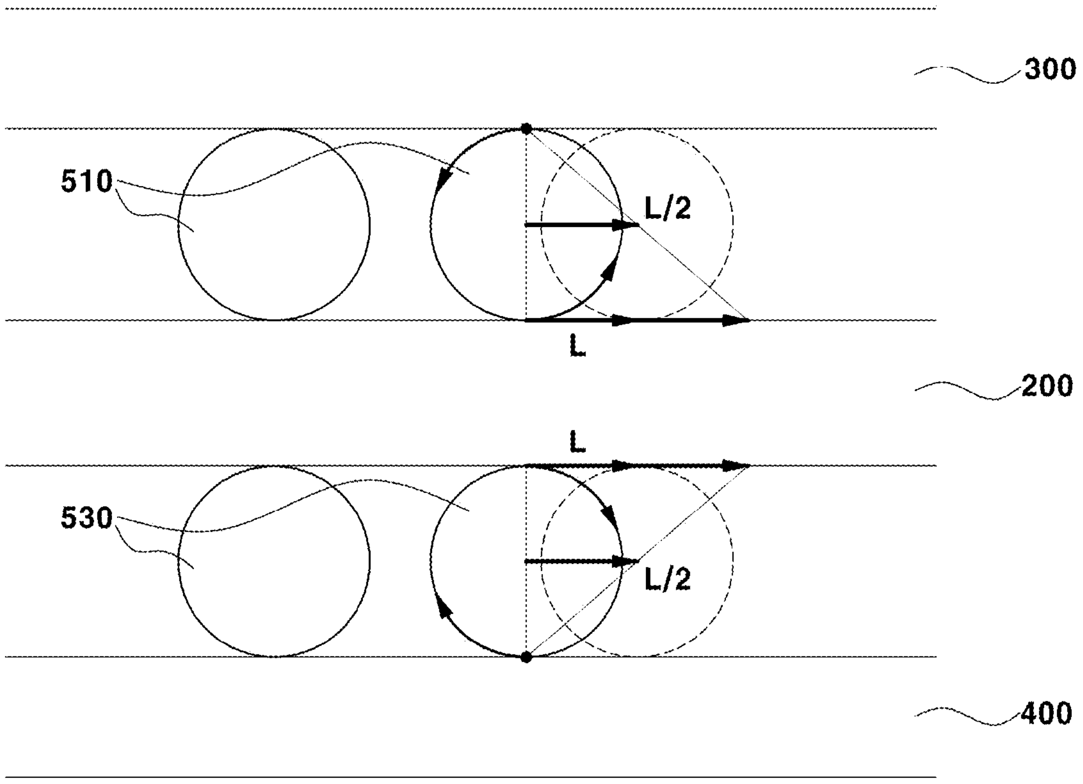
FIG. 4 is a view illustrating a rotational motion and a translational motion of a bearing unit for the isolation structure applied between the upper and lower seat frames for the vehicle.

FIG. 4 illustrates rotary motion and translational motion of the bearing unit 500 of the isolation structure applied between upper and lower seat frames for a vehicle as an embodiment of the present disclosure.

Referring to FIG. 4, the isolation structure applied between upper and lower seat frames for a vehicle according to an embodiment of the present disclosure may be configured such that the vibration energy transmitted to the lower assembly 200 is converted into the kinetic energy of the bearing unit 500 when vibration is transmitted to the lower assembly 200 and thus the lower assembly 200 is displaced within a preset displacement value.

In addition to this, when vibration is transmitted to the lower assembly 200 and thus the lower assembly 200 is displaced in excess of the preset displacement value, it may be configured such that the vibration energy transmitted to the lower assembly 200 is converted into motion energy of the bearing unit 500, and such that the damper 700 additionally attenuates the flow noise and the friction noise.

Figure 5:
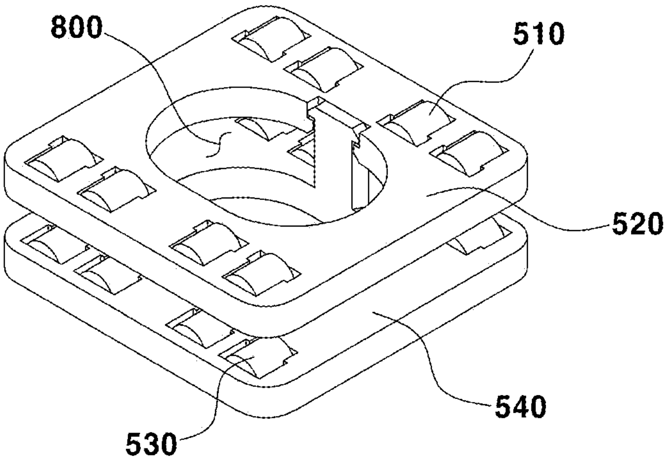
FIG. 5 is a view illustrating a rotational motion and a translational motion of the bearing unit for the isolation structure applied between the upper and lower seat frames for the vehicle.

Meanwhile, the damper 700 may be configured to prevent direct collision between the components. Accordingly, in the case of the vibration applied to the seat frame 100, the damper 700 is configured to absorb the vibration through the bearing unit 500, to relieve flow impact, and to suppress vibration absorption, so that the damper 700 may efficiently and stably carry out a function as a vibration isolation device regardless of the width of the vibration. FIG. 5 illustrates a perspective view for the bearing unit 500 of the isolation structure applied between upper and lower seat frames for a vehicle as an embodiment of the present disclosure.

Referring to FIG. 5, the upper retainer 520 and the lower retainer 540 may be configured to further include an opening 800 in which the fastener 600 is located. Further, an area of the opening 800 may be configured to have an area that is relatively wider than a cross sectional area of the fastener 600. A shape of the opening 800 may be a circular shape, or an oval shape having eccentricity.

The opening 800 may be configured such that the bearing unit 500 is movable in the horizontal direction. More preferably; the opening 800 may have a wider area than that of the fastener 600 so as to move without interference with the fastener 600 when vibration is generated from the lower assembly 200 and the lower assembly 200 is displaced.

Meanwhile, the upper rollers 510 and the lower rollers 530 may be configured to have a ball shape or a roller shape. As an embodiment, when the upper rollers 510 and the lower rollers 530 have the ball shape, the bearing unit 500 may be displaced in multiple directions and may absorb vibration. As another embodiment, when the upper rollers 510 and the lower rollers 530 have the roller shape, the bearing unit 500 may be displaced in a horizontal direction and may absorb vibration.

In summary, the present disclosure provides the isolation structure applied between upper and lower seat frames for a vehicle, which may effectively isolate horizontal vibration without up-down fluctuation by applying the bearing unit 500 having a low friction characteristic, as the structure for isolating the vibration transmitted from the vehicle to the seat.

Although the exemplary embodiments of the present disclosure have been described for illustrative purposes, those skilled in the art will appreciate that various modifications, additions, and substitutions are possible, without departing from the scope and spirit of the present disclosure as disclosed in the accompanying claims. Further, the above-mentioned content is to express and describe the preferred embodiment of the present disclosure, and the present disclosure can be used in a variety of different combinations, changes, and environments. That is, the present disclosure can be changed or corrected within a range of the concept of the disclosure disclosed in the present specification, a range equivalent to the described disclosure content, and/or a range of technology or knowledge of the art to which the person having ordinary skill falls. The described embodiment is to explain the most preferred state for embodying the technical idea of the present disclosure, and various changes requested the specific application field and usage of the present disclosure. Thus, the above detailed description of the disclosure is not intended to limit the present disclosure due to the disclosed embodiment. Further, the attached claims should be interpreted as including other embodiments.

What is claimed is:

1. A vibration isolation structure for isolating vibration in a seat, the vibration isolation structure comprising:

a lower assembly configured to fix a lower portion of a seat frame and fastened to a vehicle body;

an upper assembly configured to fix an upper portion of the seat frame;

a plate located below and apart from the lower assembly; and a bearing unit located between the upper assembly and the lower assembly and between the lower assembly and the plate, and configured to include bearings configured to carry out rotary motion and translational motion in a horizontal direction in response to vibration transmitted to the lower assembly, wherein the upper assembly, the bearing unit, the lower assembly, and the plate are coupled through a fastener without an up-and-down play.

2. The vibration isolation structure of claim 1, further comprising a damping unit disposed between the upper assembly and the lower assembly so as to attenuate flow noise and friction noise.

3. The vibration isolation structure of claim 2, wherein, when vibration is transmitted to the lower assembly and when the lower assembly is displaced within a preset displacement value, vibration energy transmitted to the lower assembly is converted into kinetic energy of the bearing unit.

4. The vibration isolation structure of claim 2, wherein, when vibration is transmitted to the lower assembly and thus the lower assembly is displaced in excess of a preset displacement value, the vibration energy transmitted to the lower assembly is converted into kinetic energy of the bearing unit, and the damping unit additionally attenuates the flow noise and the friction noise.

5. The vibration isolation structure of claim 1, wherein the bearing unit comprises:

a plurality of upper rollers disposed between the upper assembly and the lower assembly so as to support the upper portion of the seat frame.

6. The vibration isolation structure of claim 5, wherein the bearing unit further comprises:

an upper retainer configured to guide the plurality of upper rollers to be rotated with predetermined interval maintained.

7. The vibration isolation structure of claim 6, wherein the bearing unit further comprises:

a plurality of lower rollers disposed between the lower assembly and the plate.

8. The vibration isolation structure of claim 7, wherein the plurality of lower rollers is configured to support the lower portion of the seat frame.

9. The vibration isolation structure of claim 7, wherein the bearing unit further comprises:

a lower retainer configured to guide the plurality of lower rollers with predetermined interval maintained.

10. The vibration isolation structure of claim 9, wherein each of the upper retainer and the lower retainer further comprises an opening in which the fastener is located.

11. The vibration isolation structure of claim 10, wherein a cross-sectional area of the opening is larger than a cross-sectional area of the fastener.

12. The vibration isolation structure of claim 7, wherein each of the upper rollers and the lower rollers has a ball shape or a roller shape.

13. The vibration isolation structure of claim 12, wherein each of the upper rollers and the lower rollers has a ball shape, and the bearing unit is displaced in multiple directions.

14. The vibration isolation structure of claim 12, wherein each of the upper rollers and the lower rollers has a roller shape, and the bearing unit is displaced in a horizontal direction.

15. The vibration isolation structure of claim 1, wherein the fastener is made up of a bolt, a nut, or a rivet coupling structure.

16. The vibration isolation structure of claim 1, wherein the lower assembly is a leg assembly that fixes the lower portion of the seat frame.

17. The vibration isolation structure of claim 1, wherein the upper assembly is a cushion assembly that fixes the upper portion of the seat frame.

18. A vehicle comprising the vibration isolation structure of claim 1.

* * * * *